(12) United States Patent
Leibinger

(10) Patent No.: US 10,392,302 B2
(45) Date of Patent: Aug. 27, 2019

(54) CEMENT CLINKER LINE AND A METHOD FOR OPERATING A CEMENT CLINKER LINE

(71) Applicant: Südbayerisches Portland-Zementwerk Gebr. Wiesböck & Co. GmbH, Rohrdorf (DE)

(72) Inventor: Helmut Leibinger, Rohrdorf (DE)

(73) Assignee: SÜDBAYERISCHES PORTLAND-ZEMENTWERK GEBR. WIESBÖCK & CO. GMBH, Rohrdorf (DE)

(*) Notice: Subject to any disclaimer, the term of this patent is extended or adjusted under 35 U.S.C. 154(b) by 0 days.

(21) Appl. No.: 16/130,815

(22) Filed: Sep. 13, 2018

(65) Prior Publication Data
US 2019/0010088 A1    Jan. 10, 2019

Related U.S. Application Data

(63) Continuation of application No. PCT/EP2017/056415, filed on Mar. 17, 2017.

(30) Foreign Application Priority Data

Mar. 18, 2016    (EP) .................................... 16161105

(51) Int. Cl.
*C04B 2/10* (2006.01)
*C04B 7/44* (2006.01)
(Continued)

(52) U.S. Cl.
CPC ............... *C04B 7/44* (2013.01); *B01D 53/02* (2013.01); *B01D 53/64* (2013.01); *C04B 7/364* (2013.01);
(Continued)

(58) Field of Classification Search
USPC ................................ 106/638, 713, 739, 740
See application file for complete search history.

(56) References Cited

U.S. PATENT DOCUMENTS

| 4,344,793 A * | 8/1982 | Burkett .................. C22B 43/00 266/148 |
| 2009/0193968 A1 * | 8/2009 | Jepsen .................. B01D 53/06 95/134 |

(Continued)

FOREIGN PATENT DOCUMENTS

WO    2010107404 A1    9/2010

OTHER PUBLICATIONS

XP-002760467, Home Products & Solutions, "Selective Catalytic Reduction, Cleaver-Brooks Manufacturing", Mar. 8, 2016.

*Primary Examiner* — James E McDonough
(74) *Attorney, Agent, or Firm* — Yakov S. Sidorin; Quarles & Brady LLP

(57) ABSTRACT

A method for manufacturing clinker includes sintering raw meal in a kiln to clinker, preheating the raw meal (prior to sintering the raw meal) in a preheater using a main flue gas stream from the kiln as heat source, dedusting the main flue gas downstream of the preheater at a temperature below the boiling point of mercury (thereby obtaining mercury loaded dust) and withdrawing a bypass flue gas stream from the kiln. The method is configured to efficiently remove mercury from the manufacturing process if mercury in the bypass flue gas is vaporized by injecting of at least a fraction of the mercury-loaded dust into the bypass flue gas stream. Subsequently, the bypass flue gas is dedusted and cooled down. Thereby, the mercury can be adsorbed by injecting an adsorbent (such as activated charcoal) into the bypass flue gas. With subsequent removal of the adsorbent, mercury is finally removed from the manufacturing process.

8 Claims, 2 Drawing Sheets

(51) Int. Cl.
  *B01D 53/02*  (2006.01)
  *B01D 53/64*  (2006.01)
  *C04B 7/36*  (2006.01)
  *C04B 7/60*  (2006.01)
  C04B 7/00  (2006.01)
  C04B 7/34  (2006.01)
  C04B 28/00  (2006.01)
  C04B 32/00  (2006.01)
  C04B 9/12  (2006.01)
  C04B 28/04  (2006.01)

(52) U.S. Cl.
  CPC .......... *C04B 7/60* (2013.01); *B01D 2257/602* (2013.01); *B01D 2258/0233* (2013.01)

(56) References Cited

U.S. PATENT DOCUMENTS

2011/0041690 A1* 2/2011 Jepsen ................. B01D 53/002
                   95/148
2015/0086453 A1* 3/2015 Gossman ............... B01D 53/64
                   423/210
2016/0133425 A1* 5/2016 Donaghey ............... B03B 9/062
                   241/24.12

* cited by examiner

CEMENT CLINKER LINE AND A METHOD FOR OPERATING A CEMENT CLINKER LINE

CROSS-REFERENCE TO RELATED APPLICATIONS

This application is a continuation of the pending International Application No. PCT/EP2017/056415 filed on 17 Mar. 2017, which designates the United States and claims priority from the European Application No. 16161105.8 filed on 18 Mar. 2016. The disclosure of each of the above-identified applications is incorporated by reference herein.

BACKGROUND

1. Field of the Invention

The invention relates to a method for manufacturing cement clinker by sintering raw meal in a kiln to cement clinker (interchangeably referred to as clinker, for short). To this end raw meal is preheated in a preheater system or tower (interchangeably referred to as preheater) with the use of a main flue gas stream from the kiln as heat source. Downstream from the preheater, the flue gas is cooled to a temperature below that corresponding to the boiling point of mercury and dedusted, thereby obtaining mercury-loaded dust. A bypass flue gas stream is withdrawn from the kiln to remove impurities from the process. The invention also relates to a cement clinker line configured to carry out, in operation such manufacturing method.

2. Description of Relevant Art

Cement clinker is an important intermediate material product created during the production of cement, for concrete. Cement clinker is produced by calcining and sintering so-called raw meal in a kiln. The raw meal is a mixture of some mining products, mainly limestone and clay and/or other alumino-silicate materials. These mining products are, in a first step of the process, dried by applying waste heat transported by kiln exhaust gas, and milled. Subsequently, the so-obtained raw meal is preheated in a so-called preheating tower ('preheater'), again with the use of kiln exhaust gas as a heat source. Often, the preheated raw meal is provided (delivered) to a calciner for (pre-) calcining of the raw meal. The preheated and optionally (pre-) calcined raw meal is then subsequently sintered in a kiln, and discharged to a clinker cooler. The described process is known in related art (an illustrative introduction is provided, for example, by Dr. Harder in *"Der Herstellungsprozess"*, published in ZKG-Handbuch Zementanlagenbau 2013/2014, p. 20 to 37, Bauverlag BV, Gütersloh).

The energy consumption of cement clinker lines is remarkable: The theoretical thermal energy required for the required chemical reactions to occur in clinker manufacturing is 1.8 Giga-Joules per ton of clinker (GJ/t). The consumed thermal energy levels of 3.3 GJ/t (including losses) have been previously reported (see, for example, Cement chemistry, H. F. W. Taylor, table 3.3, 2nd ed., Thomas Telford Publishing, London, 1997). Bayer reports a mean thermal energy of 2.9 GJ per ton of clinker for German plants in 2012 (ZKG-Handbuch Zementanlagenbau 2013/2014, p. 41). To reduce manufacturing costs, fuels like coal, the use of gas and the like is sometimes substituted by the use of plastic waste and other organic matter. These substitute fuels further augment the amount of heavy metals such as mercury in the process that are as well introduced by the mining products. (The emission of mercury has been limited by the Minamata-Convention on mercury in 2013 and thus emission limits are reduced.)

The vaporization of mercury depends on its origin in the preheater and in the kiln. The same holds true for other heavy metals, depending on their respective boiling temperatures. The mercury vapor becomes part of the flue gas that is transported towards the exhaust. However, emission of mercury via the exhaust has negative impact on the environment and should be avoided. Another part of the mercury condenses on or is adsorbed by the dust of the flue gas and is separated from the flue gas. However, the dust is usually reintroduced to the process (via the preheater) as it mainly includes clinker dust and raw-meal dust. Thus, when heating the dust up, the mercury is vaporized again and when cooling the flue gas down, the mercury condenses again. Accordingly, the mercury concentrates in the manufacturing line.

Inventors of US 2015/0086453 suggested to inject metal sulfide compounds or organic sulfide compounds into the kiln to decompose the compounds and release elementary sulfur, to have the elementary sulfur react with elementary mercury to produce mercury sulfide. Mercury sulfide can then be captured using bag filters or electrostatic precipitators.

In WO 2010/107404, it is suggested to dedust (that is, to remove the dust from) the still hot flue gas downstream from the preheater with the use of an electrostatic precipitator. The dedusted flue gas is subjected to a selective catalytic denitrification and cooled down to about 125° C. by injecting water. Subsequently, an adsorbent is injected to the cooled flue gas stream. The mercury attaches to the adsorbent and is removed from the flue gas by a downstream bag filter prior to releasing the flue gas via an exhaust.

US 2011/0041690 suggested to add mercury loaded dust to a bypass gas stream of the cement clinker line, to thereby evaporate the mercury in the bypass gas stream. Subsequently, the particulate matter is removed and can be processed further. The mercury is removed from the bypass gas stream by firstly adding oxidizing chemicals to the stream to oxidize the mercury. Subsequently, an adsorbent is added to the bypass gas stream and the mercury attaches to the adsorbent, when the stream is cooled down. The mercury loaded adsorbent is removed from the bypass gas stream.

XP-002760467 Cleaver Brooks "Selective Catalytic Reduction" (SCR) is an internet advertisement of Cleaver Brooks offering SCR installations being integrated in a boiler.

SUMMARY

Implementations of the invention solve the problem of reduction of mercury emissions and, at least in part, emissions of other heavy metal from a cement clinker line at reduced operating costs.

The idea of the invention stems from the observation that heavy metal emissions (such as, for example, mercury emissions) are low during the ramp up of the process. It thus appears that the mercury has to accumulate in the cement clinker line before it leaves the process via the exhaust. According to the idea of the invention, it is thus sufficient to maintain a low mercury concentration in the cement clinker line to reduce mercury emissions via the exhaust gas. This approach applies accordingly to reduce other heavy metal emissions.

The method for manufacturing clinker includes at least sintering raw meal in a kiln to clinker. As usual, the raw meal is preheated in a raw meal preheater ('preheater') using the flue gas produced in the kiln. After being preheated, the raw meal is provided to the kiln that is configured for calcining and sintering the raw meal to clinker. Of course, a specific implementation of the method may as well include a step of calcining the preheated raw meal at least partially in a calciner, and therefore a part of the flue gas may be optionally produced in the calciner. This aspect of the proposed methodology will not be discussed herein in any substantial detail. For the sake of the simplicity of the presentation, the idea and/or embodiment(s) of the invention are explained without explicit reference to an optional calciner. Thus, the term kiln may be understood to optionally include a calciner. In any case, the preheated raw meal is fed to the kiln that is configured to covert the preheated raw meal into clinker.

The flue gas exiting the preheater is processed as usual and cooled down to a temperature at which mercury and/or mercury compounds condense on the dust particles that are being transported by the main flue gas stream. Similarly, other heavy metals and their compounds condense on the dust particles during such processing of the flue gas.

The cooled (cold) flue gas stream is dedusted by flue-gas-dedusting means downstream from the preheater. Such process produces a mercury-loaded dust, i.e. dust containing metallic mercury and/or mercury compounds. Other heavy metals and/or heavy metals compounds are (or may be) as well attached to the dust. In this disclosure, the term 'mercury loaded dust' is used generally without explicit reference to which particular, other heavy metals and heavy metal compounds may be contained in the dust in addition to or as alternative to mercury, but includes the situation when dust contains heavy metal materials that differ from mercury. The dust includes mainly of clinker dust and raw meal, but mercury and other heavy metals which have been transported with the flue gas stream are adsorbed by the dust particles. Such adsorption is enhanced, if and when the flue gas is cooled below the boiling temperature of mercury. Preferably, the flue gas is cooled down to about 250° C. or even lower to enable dedusting the flue gas using bag filters (which have lower installation and operational costs than electrostatic precipitators). Moreover, the lower the temperature of the flue gas (prior to the dedusting step) the higher the degree to which mercury or other heavy metals attach to the dust and, therefore, the lower the mercury content in the dedusted main flue gas stream.

Cooling of the flue gas stream can be carried out, e.g. by using a heat exchanger that in turn heats another fluid (or raw meal); thus the thermal energy transported with the flue gas can be used as process heat, e.g. for a turbine process. Other possibilities for cooling can be used in related embodiments, e.g. mixing the flue gas with a cold(er) gas, water spray cooling and the like. The flue gas may as well be denitrified, for example as explained in EP 2 545 337. It is not relevant, for implementation of a particular embodiment of the invention, at which particular stage of the process dedusting of the main flue gas takes place (e.g. prior or after the action of denitrification, in one implementation), but at least one dedusting step should take place at a temperature level at which a significant part of the mercury content in the flue gas is attached to or otherwise adsorbed by the dust particles. The dust is thus mercury loaded and its main constituents are raw meal and clinker dust.

At least a fraction of the mercury (and other heavy metals) of the mercury-loaded dust is vaporized in a bypass flue gas stream. In contradistinction with the theoretic definition of 'vaporizing', vaporization of mercury as used here simply means subjecting mercury (or the respective mercury compounds) to a phase transition from solid or fluid to a gaseous state, no matter and with no regard to how this phase transition takes places in detail. In other words, after the vaporization, the present mercury is at least to a large extent in a gaseous state no matter which particular process is used (e.g. sublimation, vaporization, evaporation, boiling . . . ). While the related term 'gasification' can be also used in this situation, such related term is typically used only for converting hydrocarbon fuels to carbon monoxide and could thus be potentially misleading.

Alternatively or additionally to vaporizing at least a fraction of the mercury (that is attached to the mercury-loaded dust provided by the clinker line), other mercury-loaded matter—preferably also in the form of dust or small particles—can be added to the bypass flue gas stream to vaporize mercury. Such other mercury-loaded matter can be, for example, in the form of mercury-loaded slag from other industrial processes or mercury polluted landfill. Depending of the type of mercury-loaded matter in question and its amount, the subsequently obtained mercury-free matter can be provided to the kiln and/or as additive to the clinker. Alternatively, the mercury-free matter can be used for/in other processes or deposited to a landfill site.

The vaporization of mercury can be effectuated by injecting at least a fraction of the mercury-loaded dust (and/or matter) into the bypass flue gas stream, which is also drawn from the kiln. The bypass flue gas stream contains a fraction (typically 3% to 10%, or a higher portion) of the flue gas originating from the kiln (and/or a calciner) which is separated from the main flue gas stream ('flue gas stream', for short) entering the preheater, before the flue gas is significantly cooled. The bypass flue gas, therefore, bypasses the preheater. Such bypass flue gas streams as such are known and described in, for example, the European-application number 15176157.4 and in the international publication WO 2012/163664 A1 and the references cited therein, each of which is incorporated by reference as if fully disclosed herein.

To avoid ambiguities, the term injecting a fraction of mercury-loaded dust or other matter to a gas stream is used to refer to and define the addition of the fraction of dust/matter to the respective gas stream. In other words, the fraction of dust/matter is disposed in the corresponding duct, e.g. using a mixing chamber, a rotary feeder and/or other appropriate arrangements. After the step of injecting, the mercury loaded raw meal may be transported with the respective gas stream. For example, the dust/matter is thereby heated by the bypass gas stream, and, caused by the process of heating, the mercury changes into its gaseous state.

After the step of vaporizing the mercury with the heat provided by the bypass flue gas ('bypass gas', for short), the bypass gas is dedusted in a first bypass gas dedusting step. The bypass gas is preferably cooled down to a temperature $T_1$, e.g. to about 400° to 500° C., prior to being dedusted, to reduce installation costs. Further, in this temperature-regime chlorines and other salts in the bypass gas condense on the dust and are thus withdrawn from the bypass gas. The temperature of the bypass gas in the first bypass gas dedusting step should be preferably selected to be at least equal or preferably higher than the boiling temperature of mercury (or the respective mercury compounds) to prevent condensation of mercury on the dust. In a related embodiment, however, the temperature of the bypass gas can be chosen to be even below the boiling point, as elementary mercury has a significant vapor pressure even at temperatures below its boiling point. In the latter case, however, a part of the mercury will be removed with the dust (which is possible, but not necessarily intended). In practice, the purpose and goal of such temperature-setting is to obtain at least essentially mercury-free dust (and/or matter). (The term "essentially mercury-free", as used in conjunction with a specific material or matter that has undergone a mercury-removal procedure, is defined to include not only the substantially zero concentration of mercury but also the concentration of mercury, present in such matter that is lower than the concentration of mercury is such matter before the mercury-removal procedure.) The mercury-free dust may be provided to the kiln being configured for converting it into clinker, e.g. via the use of a preheater. The term 'mercury-free dust' should thus be understood as dust with a preferably significantly reduced mercury content compared to the mercury content that existed in the mercury-loaded dust prior to heating the mercury-loaded dust. Significantly reduced content of mercury includes content that is less than 75%, preferably less than 50%, even more preferably less than 25% and most preferably less than 10% of the initial mercury content present prior to the mercury removal step of the procedure.

After dedusting the bypass gas, is the bypass gas may be cooled down—in a second cooling step—to a temperature $T_2$ that is preferably well below the boiling temperature of mercury (e.g. 70 to 150° C., in one example). The cooling may be carried out using a heat exchanger, such as for example a steam boiler, to enable the use of the heat transported by the bypass gas as process heat. In addition (e.g. after or prior to this second step of cooling of the bypass gas), an adsorbent may be injected into the bypass gas. The mercury and other heavy metals attach to the adsorbent and can be removed from the bypass gas with the adsorbent by simple filtering or other dedusting techniques. More generally, the bypass gas is dedusted (again) by adsorbent removal means configured to remove the mercury-loaded adsorbent from the bypass gas. The adsorbent may comprise or even consist of activated charcoal particles. Other particles can be used as well or in addition (such as, e.g., clinker dust and/or raw meal) as initially injected into the bypass gas stream. At least a fraction of the removed mercury-loaded adsorbent is preferably removed from the process and replaced with fresh adsorbent. With the use of such removal of the adsorbent, the mercury (including its compounds) is finally removed from the process. Another fraction of the removed adsorbent can be reinjected to the preferably cooled bypass gas at a location upstream from the adsorbent removal means, i.e. it is recirculated and, preferably, only a fraction of it is replaced with the fresh adsorbent Preferably, the bypass flue gas is subjected to a denitrification prior to the second cooling step. For example, a reductant may be injected prior to the first step of dedusting of the bypass gas and the dedusting means may comprise or consist of a filter that includes a catalyst configured for denitrification (i.e. for converting of nitrogen oxides to harmless substances such as diatomic nitrogen and water, for example). Such filter or filters may include ceramic filter elements, into which at least one catalyst is embedded or incorporated. In other words, the filter(s) comprise(s) at least one catalytic substance such as titanium oxide, oxides of base metals (such as vanadium, molybdenum and tungsten), zeolites, and/or precious metals. The use of such catalysts not only reduce the nitrogen oxides, but also convert the mercury (Hg) to a higher oxidation state, e.g. to $Hg^{+2}$. (The catalyst increases the oxidation state of the Hg to $Hg^+$ or $Hg^{2+}$ thereby simplifying the adsorption of Hg, as well: the oxidized mercury then attaches better to the adsorbent than non-oxidize mercury.)

In other words, in one implementation of the invention, a reductant may be injected prior to the first step of dedusting of the bypass flue gas into the bypass flue gas, and the bypass flue gas may be dedusted using a catalytic hot gas filter to thereby denitrify the bypass gas. At the same time, mercury atoms in the bypass flue gas are oxidized. The latter reaction enhances the subsequent adsorption of the oxidized atoms of mercury. In addition, the catalyst removes dioxins and other volatile organic substances that could and would also attach to the adsorbent (at least if the adsorbent is activated charcoal). Thus, the active surface of the adsorbent is not reduced by organic substances.

The above-outlined scheme has a couple of advantages: Firstly, it enables to essentially remove the mercury (and/or other heavy metals), added to the process by the mining products and the fuel, from the process and therefore to keep mercury emissions (via the exhaust) low as compared with those characterizing more conventional processes. Further, in practice the bypass gas is cooled to a temperature $T_1$ by adding a cooling gas (such as, for example, fresh air) to the bypass gas to condense the chlorides in the bypass gas on the dust. The addition of the cooling gas, however, augments the installation costs for the conduits, dedusting means, catalysts, and the like as the effective diameter must be augmented (with the goal of increasing the cross-sectional area of the conduits). As a result of adding the cold mercury-loaded dust previously withdrawn from the main flue gas stream, the bypass gas is cooled and thus smaller amount of the cooling gas is required. In turn, the bypass gas flow rate is reduced. Moreover, if fresh air is used to cool the bypass gas to condense the chlorides, undesired oxygen is inevitably added to the bypass gas. Therefore, by reducing the used amount of cooling gas, the oxygen concentration in the bypass gas is kept low. Furthermore, due to injecting the dust to the bypass gas, condensation of the chlorides in enhanced.

In one embodiment, at least a fraction of the mercury-loaded dust may be added to a flow of transport gas, conveying the mercury-loaded dust to the bypass gas. By mixing the transport gas with the bypass gas (e.g. in a mixing chamber), the mercury-loaded dust is injected into the bypass gas flow. Preferably, the transport gas has a lower temperature than that of the bypass gas, to thereby cool the bypass gas flow down to $T_1$ (e.g. to a temperature from about 200° C. to about 500° C., preferably to a temperature within the range from 300° C. to 450° C.).

Preferably, the transport gas is branched off from the main flue gas flow after it has been cooled below the mercury boiling temperature, preferably prior to dedusting it to obtain the mercury-loaded dust. At least a fraction of the mercury-loaded dust provided by the flue gas dedusting means may be added to the transport gas flow and mixed with the bypass gas as cooling gas to thereby inject the mercury-loaded dust into the bypass gas and thus vaporize the mercury. No oxygen is added to the bypass gas and the transport gas is available at the place where the mercury loaded dust is provided. Thus, installation costs can be kept low. The dust is removed as explained above and can be added to the clinker as it is essentially free of mercury.

Preferably, the dedusted bypass gas is provided to a heat exchanger configured for heating a heat carrier fluid and in turn cooling the previously dedusted bypass gas down to e.g. such temperature $T_1$ below the boiling temperature of mercury. Thus, mercury can be adsorbed effectively by the adsorbent and the thermal energy of the bypass gas can be recuperated and used as process heat.

As explained above, a fraction of the removed adsorbent may be injected into the cooled bypass flue gas again, and another fraction of the removed adsorbent may be removed from the process. This methodology enables the user to efficiently use the adsorbent and keep the amount of adsorbent to be deposited due to its mercury load low.

As a person of ordinary skill in the art will readily recognize from the above-presented discussion, the main flue gas stream is preferably cooled after the preheater and prior to its dedusting. In one implementation, there may be used an additional dedusting step prior to cooling the main flue gas flow down, to thereby remove a part of the dust prior to condensing the mercury on the remaining portion of the dust. Thereby, the amount of mercury-loaded dust is reduced, and the mercury concentration of the mercury-loaded dust is enhanced. As a result, less mercury-loaded dust needs to be provided to the bypass gas flow. The additional dedusting step further enhances a selective catalytic reduction of the main flue gas stream. This configuration is referred to as 'low dust configuration'. In addition, the mercury is oxidized even further and attaches better to the remaining dust.

As used in this application, the terms 'upstream' and 'downstream' indicate and define particular positions with respect to (in relation to) the direction of the flow of the flue gas, i.e. relative to the bypass gas stream or to the main flue gas stream. The terms 'stream' and 'flow' are used interchangeably to indicate that the respective gases are transported in conduits connecting the respective components of the clinker line. 'Stream' and 'flow' have sometimes been omitted for simplicity in parts of this application, or in other words, the terms 'stream' and 'flow' have been added to the terms flue gas and bypass gas only, if it appeared particularly appropriate.

The term vaporization of mercury means and defines a phase transition of metallic mercury or of mercury compounds (like $HgCL$, $HgCL_2$, $HgBr$, $HgBr_2$, . . . ) from a liquid or solid phase into a gas phase. The term 'mercury'—unless explicitly stated otherwise—refers to mercury no matter in which form (metallic, ionic, bound to a compound). Condensation in turn is a phase transition from gas phase to a liquid or to a solid phase. Other heavy metals and their compounds exhibit similar behavior and can be removed essentially in the same way, provided the respective boiling temperature is below temperature of the bypass gas.

The term filter or filtering is used only to indicate that dust (or other solid) matter is removed from a gas stream. It is generally irrelevant which process is used to separate the dust from gas. Lots of different techniques have been suggested and can be employed as required. Bag filters for example are cheap but not suited for dedusting hot gases. Ceramic filters, electrostatic precipitators and cyclones can be uses as well at elevated temperatures.

BRIEF DESCRIPTION OF THE DRAWINGS

In the following, the invention will be described by way of example, without limitation of the general inventive concept, on examples of embodiment and with reference to the drawings.

While the invention can be modified and assume alternative forms, specific embodiments are discussed below as but examples. The drawings and detailed description are not intended to limit the invention to the particular form disclosed, but to the contrary, the scope of the intention is to cover all modifications, equivalents and alternatives falling within the spirit the present invention as defined by the appended claims.

DETAILED DESCRIPTION

Figure 1:
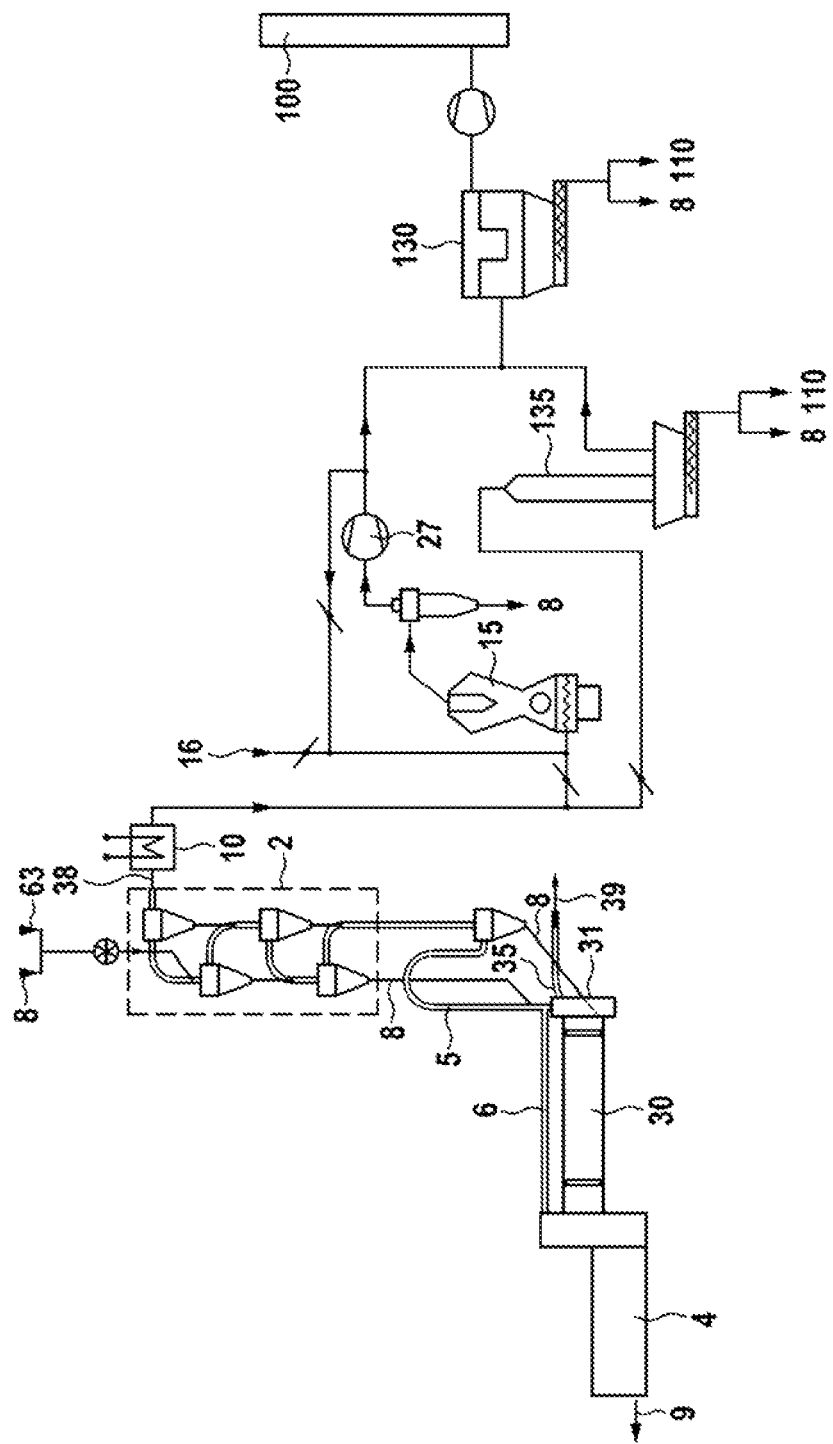
FIG. 1 shows a schematic sketch of a cement clinker line.

The cement clinker line in FIG. 1 comprises as usual a preheater 2, a kiln 30 and a clinker cooler 4. Raw meal 8 is preheated in the preheater 2 and provided to the kiln inlet 31. In the kiln 30 the raw meal 8 is calcined and sintered to clinker. The clinker 9 is discharged on the clinker cooler 4 and can be further processed after being cooled down (indicated by an arrow, symbolizing the clinker 9), e.g. by milling. Hot air from the clinker cooler 4 is provided to the kiln 30 as secondary air and leaves the kiln 30 at its inlet 31 as flue or exhaust gas. Said kiln exhaust gas is dust loaded and hot (typically 1500° C. to 2000° C.). The main amount of the kiln exhaust gas (briefly flue gas) is provided to the preheater 2 configured for pre-warming the raw meal 8. Optionally, a calciner 5 may be installed between the preheater 2 and the kiln 30. In that case the raw meal 8 is provided from the preheater 2 to the calciner 5 and from the calciner 5 to the kiln 30. At least a part of the kiln exhaust gas may be provided to the preheater 2 via the calciner 5. Further, tertiary air may be provided from the clinker cooler 4 to the calciner 5. The flue gas 38 exiting the preheater 2 is cooled down as indicated by a heat exchanger system 10 (heat exchanger, for short), representing simply some cooling means or cooler. (In one example, the heat exchanger is a heat transfer device configured to transfer thermal energy from the flue gas(es) to the coolant, and may include a coolant conduit with a coolant inlet and a coolant outlet wherein the coolant inlet and the coolant outlet are in fluid communication via the coolant conduit. The heat exchanger may additionally include a flue gas conduit having a flue gas inlet and a flue gas outlet, also in fluid communication via the flue gas conduit. The heat exchanger is configured to maintain the coolant conduit and the flue gas conduit in thermal contact with each other.) The heat exchanger 10 enables to recuperate thermal energy when cooling the flue gas 38 and to use the thermal energy as process heat. The flue gas is next dedusted as indicated by dedusting system 130, 135 or used to pre-warm raw meal being produced in a raw-meal mill 15. The raw meal 8 provided by the raw-meal mill 15 is provided to the preheater 2. The raw-meal mill 15 can as well be heated by bypass gas (see FIG. 2) or other warm gases, as indicated by warm gas inlet 16.

Regardless of whether the flue gas 39 is used to heat the raw-meal mill 15 or if it bypasses the raw-meal mill 15, the gas is dedusted at least by one of the dedusting means (dedusting system) 130, 135. The dust being removed by filters comprises mercury as due to the cooling step indicated by reference numeral 10, the mercury is absorbed by the dust. A fraction of the dust is entered to the preheater as indicated by arrow head 8, i.e. the corresponding fraction of the mercury is reintroduced as raw meal 8 into the preheater 2. Another fraction 110 may be removed and injected to a bypass gas stream 39 as explained in detail with respect to FIG. 2.

Figure 2:
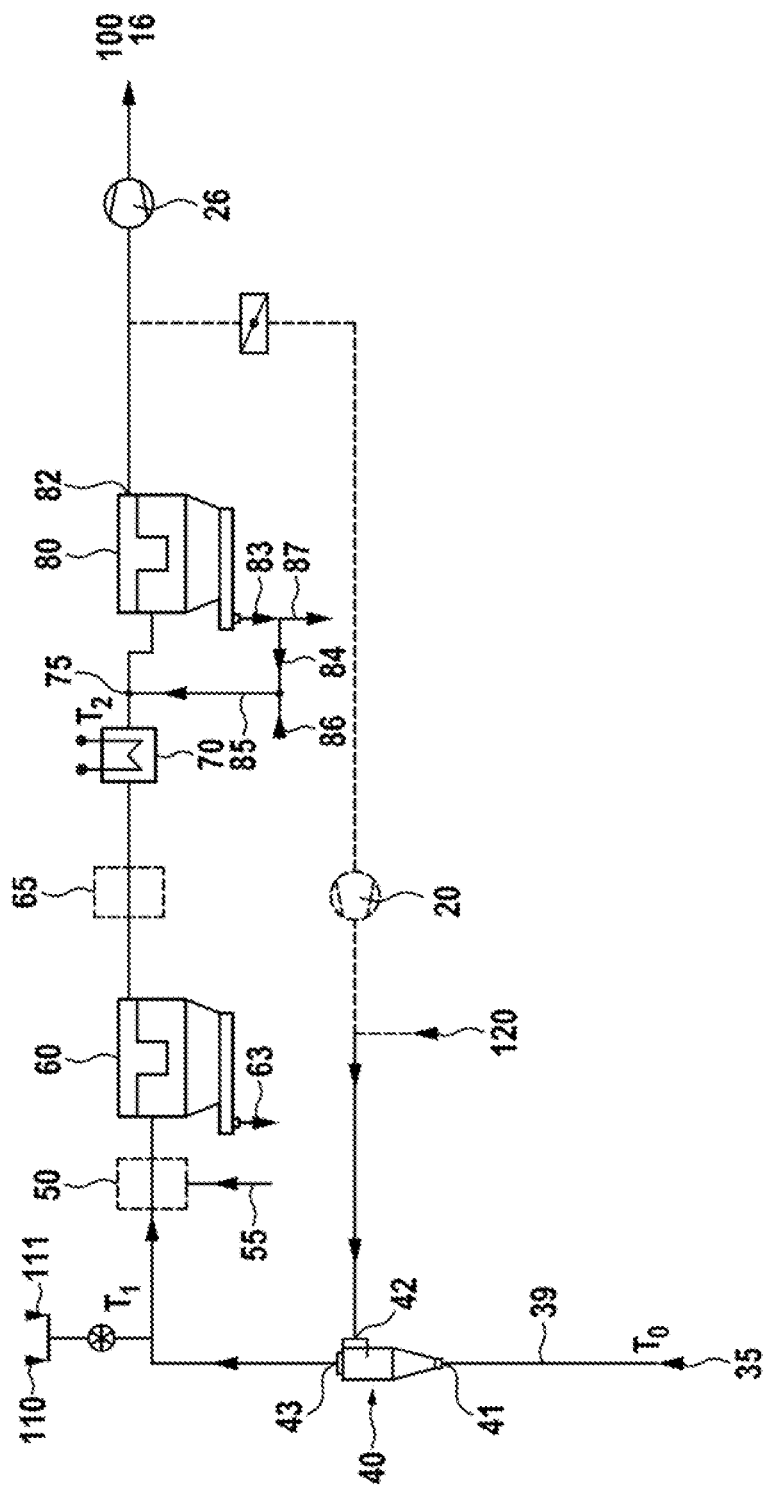
FIG. 2 shows a schematic flow diagram of a chloride bypass system.

FIG. 2 shows a bypass branch of a cement clinker line. At least fraction, typically about 3% to 10% (possible 1% to 30% or even more if appropriate) of the kiln exhaust gas is drawn off via a chloride bypass intake 35 (cf. FIG. 1) which is a bypass exhaust of the kiln 30. From said chloride bypass intake 35, bypass gas 39 flows with a temperature T0 of typically about 1500° C. to 2000° C. to a first inlet 41 of a mixing chamber 40 configured for mixing the bypass gas 39 with a cooling gas in a first cooling step. The cooling gas may be provided to the mixing chamber by a second inlet 42. Thereby, the temperature $T_1$ of the bypass gas leaving the mixing chamber 40 via outlet 43 can be adjusted to e.g. 350 to 450° C. Upstream of the mixing chamber 40, the mercury loaded dust 110 previously withdrawn from the filters 130, 135 may be injected to the bypass gas 39. Alternatively, or additionally other mercury loaded dust or matter 111 may be injected as well. This other mercury loaded dust may be e.g. some mercury loaded waste product of another industrial process. The terms "another industrial process" and "other industrial processes" or similar terms are used herein to refer to and define any process that is not a sub-process or processing step of cement clinker manufacturing. For example mercury containing slag could be treated using the auxiliary flue gas branch, to thereby separate the mercury and reduce the amount of mercury contaminated waste to be deposited. Depending on the composition of the waste product 111 and the amount to be treated, the mercury free dust 63 (or more generally mercury free matter 63) can be provided together with the raw meal to the preheater. Alternatively, the mercury free dust 63 can be used as additive to the clinker.

Due to the temperature $T_1$, the mercury (and/or the mercury compounds) of the mercury loaded dust is/are vaporized in the bypass gas stream 39, or in other words, the mercury of said dust 110, 111 obeys a phase transition into the gaseous phase. After heating the dust 110, 111, it is essentially free of mercury, or at least has a significantly reduced mercury content. Next, a reductant 55 like ammonia, ammonium or the like is injected into the bypass gas as indicated by the dashed box 50. The dashed box indicates that the reductant injection is optional, but a preferred embodiment. The cooled, dust loaded, mercury containing bypass gas 39 is subsequently ducted to a hot gas filter 60 (as example for any suited dedusting system) to dedust the bypass gas. As explained above, the hot gas filter 60 may comprise at least one catalyst configured for reducing nitrogen oxides to diatomic nitrogen and water. Alternatively, the catalyst may be a separate unit as indicated by the dashed box 65. Thus, the bypass gas is dedusted and denitrified using a selective catalytic reduction (SCR), but as the temperature is still above the boiling temperature of the mercury, the mercury remains in the bypass gas. The dust 63 being removed by the hot gas filter 60 has a low mercury concentration and can be added with the raw meal 8 via the preheater 2 to the kiln 30 (see FIG. 1).

The catalyst changes the oxidation state of metallic mercury Hg to $Hg^{+2}$ enhancing its subsequent absorption. Next, the dedusted bypass gas 39 is cooled to a temperature $T_2$ below the boiling temperature of mercury, preferably to about 70° C. to 150° C. This is symbolized by a heat exchanger 70. The heat being removed from the bypass gas stream 39 in the heat exchanger can be used as process heat in the clinker process or for heating a steam boiler. After cooling the bypass gas to $T_2$, an adsorbent 85 is injected into the bypass gas at 75 to adsorb the mercury and preferably other heavy metals. Downstream of the injection, the adsorbent and thus the mercury is removed from the bypass gas stream 39 using a filter 80, being an example for any suited dedusting system. The mercury loaded adsorbent 83 can be recirculated at least in part (see arrow 84). A further part 87 of the mercury loaded adsorbent is removed from the process and replaced by fresh adsorbent 86. The cleaned bypass gas leaving the filter 80 at 82 has a low dust concentration and a low mercury content. It can be used as process gas, e.g. for drying raw meal as indicated by 16. It can as well be used as cooling gas as indicated by the dashed line or released as indicated by 100. The cleaned bypass gas may as well be provided via duct 16 to the raw meal mill 15. In a further embodiment, the cleaned bypass gas may be fed to the clinker cooler as coolant.

It will be appreciated by those skilled in the art having the benefit of this disclosure that this invention is believed to provide a method for manufacturing clinker and a cement clinker manufacturing line. Further modifications and alternative embodiments of the invention will be recognized by those skilled in the art in view of this description. Accordingly, this description is to be construed as illustrative only and is for the purpose of teaching those skilled in the art the general manner of carrying out the invention. Described elements and materials may be appropriately substituted, parts and processes may be reversed, and certain features of the invention may be utilized independently, as would be appreciated by one skilled in the art after having the benefit of this description of the invention. Changes may be made in the elements de-scribed herein without departing from the spirit and scope of the invention as described in the following claims.

LIST OF REFERENCE NUMERALS 2 preheater
4 clinker cooler
5 calciner
6 tertiary air duct
8 raw meal
9 clinker
10 cooling means/heat exchanger (optional)
15 raw-meal mill
16 warm gas inlet
20 ventilation system
26 ventilation system
27 ventilation system
30 kiln
31 kiln inlet (raw meal inlet and flue gas outlet)
35 chloride bypass intake
38 flue gas
39 chloride bypass gas
40 mixing chamber
41 first inlet of mixing chamber
42 second inlet of mixing chamber
43 outlet of mixing chamber
50 reductant injector
55 reductant
60 dust removal system
63 dust, essentially mercury free/matter
65 catalyst unit
70 cooling system/cooler
75 adsorbent injecting system
80 dedusting system/adsorbent removal system
82 outlet of dedusted bypass gas
83 mercury loaded adsorbent
84 recirculated adsorbent
85 adsorbent
86 fresh adsorbent
87 removed adsorbent
100 exhaust system 110 mercury loaded dust from the clinker process (optional)
111 mercury loaded waste product (dust/matter from another industrial process that is not part of clinker manufacturing) (optional)
120 cooling gas inlet
130 dedusting system
135 dedusting system

The invention claimed is:

1. A method for manufacturing clinker, the method comprising:
   sintering raw meal in a kiln to clinker,
   preheating the raw meal in a preheater with the use of a main flue gas stream from the kiln as a heat source,
   dedusting the main flue gas stream at a location downstream from the preheater at a temperature below the boiling point of mercury, to obtain dedusted flue gas and mercury-loaded dust,
   withdrawing a bypass flue gas stream from the kiln,
   vaporizing at least one of mercury and a mercury compound in the bypass flue gas by injecting at least one of (i) a fraction of the mercury-loaded dust and (ii) a fraction of mercury-loaded waste-products into the bypass flue gas stream,
   dedusting the bypass flue gas stream,
   cooling the bypass flue gas stream to form a cooled bypass flues gas stream and binding at least one of the mercury and the mercury compound to an adsorbent, said adsorbent being injected into the cooled bypass flue gas stream,
   removing the adsorbent from the cooled bypass flue gas to form removed adsorbent and further processing the cooled bypass flue gas,
   wherein the method further comprises at least injecting, into the bypass flue gas stream, a reductant prior to said dedusting the bypass flue gas stream, and
   wherein said dedusting the bypass flue gas stream is carried out with the use of catalytic hot gas filter, to oxidize mercury atoms in the bypass flue gas stream and to convert nitrogen oxides into nitrogen in the same processing step.

2. The method of claim 1, further comprising adding the mercury-loaded dust i a flow of transport gas, which is mixed with the bypass flue gas stream to cool the bypass gas stream down.

3. The method of claim 2, wherein the transport gas is flue gas that is diverted from the main flue gas stream prior to said dedusting the main flue gas stream to obtain the mercury-loaded dust.

4. The method of claim 1, further comprising providing the dedusted flue gas to a heat exchanger that is configured to heat a heat carrier fluid and to cool the dedusted flue gas down.

5. The method of claim 1, further comprising injection a first fraction of the removed adsorbent into the cooled bypass flue gas stream and removing a second fraction of the removed adsorbent from a process of said manufacturing.

6. The method of claim 1, wherein the cooling is carried out at a processing location downstream from the preheater, said cooling occurring prior to said dedusting the main flue gas stream.

7. A cement clinker line configured for manufacturing clinker according to claim 1, the clinker line comprising:
   a kiln configured to sinter raw meal to clinker, the kiln having a main exhaust configured to draw a stream of a main flue gas and a bypass exhaust configured to draw a stream of a bypass flue gas,
   a preheater connected to the kiln and configured to receive the main flue gas from the main exhaust and to preheat the raw meal with the use of the main flue gas stream from the kiln as a heat source,
   a first dedusting system located downstream from the bypass exhaust and configured to dedust bypass flue gas to form dedusted bypass flue gas,
   a second dedusting system located downstream from the preheater, the second dedusting system configured to dedust the main flue gas at a location downstream from said preheater at a temperature below the boiling point of mercury, to obtain dedusted flue gas and mercury-loaded dust,
   an injecting system operably cooperated with the first dedusting system;
   a conveying system configured to perform at least one of i) conveying at least a first fraction of dust separated by the second dedusting system and ii) conveying a second fraction of mercury-loaded waste product, received from another industrial process, to the injecting system,
      wherein the injecting means is configured to inject at least one of the first and second fractions into the bypass flue gas at a location upstream from the first dedusting system to vaporize at least one of mercury and a mercury compound, contained in said at least one of the first and second fractions, in the bypass flue gas,
   a cooling system located downstream from the first dedusting system, the cooling system configured to cool the dedusted bypass flue gas to form a stream of cooled bypass flue gas,
   an adsorbent-injecting system located downstream from the cooling system, the adsorbent-injecting means configured to inject an adsorbent into the cooled bypass flue gas, the adsorbent being structured to bind at least one of the mercury and the mercury compound to the adsorbent, and
   an adsorbent-removal system located downstream from the adsorbent-injecting system and configured to remove the adsorbent from the cooled bypass flue gas to form removed adsorbent,
   and
   further comprising (a) a catalyst that is either located downstream from the first dedusting system or is incorporated in the first dedusting system and (b) a reductant-injecting system configured to inject, into the bypass glue gas, a reductant at a location upstream of the catalyst, wherein the catalyst is configured to denitrify the bypass flue gas thereby oxidizing said at least one of the mercury and the mercury compound and in the same process step converting nitrogen oxides into nitrogen.

8. The cement clinker line of claim 7, further comprising at least a feeding system configured to feed at least a fraction of removed adsorbent to an adsorbent input of the adsorbent-injecting system.

* * * * *